May 7, 1929.  G. H. PASSELECQ  1,711,614
CONCENTRATING APPARATUS
Filed Jan. 12, 1925
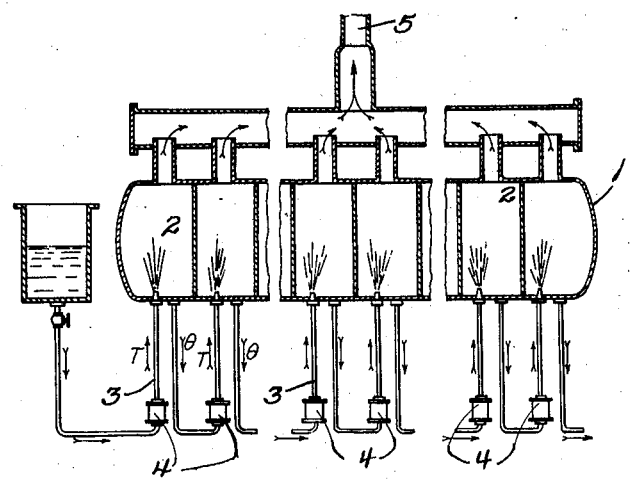
INVENTOR
G. H. Passelecq
by O'Neill & Bunn
ATTORNEYS Patented May 7, 1929.

1,711,614

UNITED STATES PATENT OFFICE.

GEORGES HECTOR PASSELECQ, OF ENGHIEN, FRANCE.

CONCENTRATING APPARATUS.

Application filed January 12, 1925, Serial No. 1,999, and in France January 14, 1924.

The object of the present invention is to extend the process described in Patent No. 1,431,217, to the diffusion and hot lixiviation of all soluble matters, as well as to the concentration and evaporation of all saline solutions.

The improved process has for its objects the following improvements:

1. Maintaining a constant temperature in the apparatus.
2. Producing maximum concentration of the solution in each concentrator at the constant temperature.
3. Controlling circulation exclusively by the work of concentration itself.
4. Replacing the apparatus employed up to the present for causing the solution to circulate in the concentration (air, steam or liquid pressure, pumps, ejectors, etc.) by the use of a thermo-siphon.
5. Exactly controlling the output, as this does not depend on any factor outside the battery.
6. Exactly controlling the expenditure of steam for re-heating; this expenditure can be calculated and controlled at will by adjusting the speed of the solution in the thermo-siphon (this speed only depends on the number of calories required for re-heating the solution).
7. Lowering the steam consumption; the coefficient of transmission in the thermo-siphon is very high because of the great velocity in the machine (this velocity may reach several meters per second).
8. Optional operation under pressure, at atmospheric pressure, with a partial vacuum or with a vacuum.

These features are applicable to all other materials besides "Osseine" whose methodical extraction was the object of the above mentioned patent.

The above method of working can obviously be applied to any kind of concentration.

Referring to the figure, which shows the apparatus in longitudinal, vertical section, it is obvious that the ordinary cluster of tubes of an apparatus for effecting concentration, could be replaced by a series of thermo-siphons 3 dividing the evaporation chamber 1 into a certain number of sectors 2, communicating with the thermo-siphons 3 in the following manner: The thermo-siphon 3 opens into each sector 2, and is fed by piping connected to the adjacent sector as shown on the figure. In this case the device works as follows: As soon as the heating element 4 is supplied with steam for heating the solution, it projects into the sector 2 the solution which it has heated to a temperature T (T being the temperature at which the concentration should be made). The evaporation produced in the evaporating chamber 2 causes a decrease in the temperature of the solution which passes from the sector 2 at the temperature $\theta$, into the next thermo-siphon 3, which in turn passes it on into the next sector 2 at the temperature T and so on up to the last sector. Each sector permits the steam produced by the heating element 4 to pass off through an outlet 5, which may have a vacuum pump attached thereto.

The quantity of water removed by a passage through the evaporating chamber, determines the number of sectors required. The thermo-siphons are designed to restore $(T-\theta)$ calories to the solution.

The operation of the appliance is thus simply controlled by the admission of the solution into the first thermo-siphon 3, no additional attention being required except to extract the concentrated solution as it leaves the last thermo-siphon 3.

The novel characteristics of the device are therefore as follows:

1. Replacement of a cluster of tubes such as ordinarily used for vapourization by a series of thermo-siphons which simply re-heat the liquid after each passage through the evaporation chamber.
2. Continuous circulation of the liquid to be concentrated, from one sector to the following one, rendering the mixture of solution of different degrees of concentration impossible.
3. Automatic and very rapid circulation of the liquid by the use of thermo-siphons.
4. The velocity obtained may reach several metres per second, and enables the liquid to be atomized upon arrival in the evaporation chamber.
5. Very important diminution in the heating surfaces because of the great velocity of the liquid in the thermo-siphon re-heaters.
6. Automatic functioning of the apparatus, the control being effected by the admission of the solution at the inlet.

Control of the circulation speed may be effected by placing on the tubular plate adjacent the inlet of each sector, a cap having the shape of a cone, with an opening at its top, the solution then passing through said opening with a speed which must be a function of the section of the opening.

Experience with this type of evaporator has shown that if the dimensions of the thermo-siphons have been carefully calculated, the fluid passing through the opening becomes a mixture of steam and solution in a vesicular state.

Indeed, the steam produced at the interior of the thermo-siphon is sucked immediately into the vacuum chamber, and passes through the opening of the cone with a speed, which depends only on the section of said opening. If said section has been correctly calculated, the steam acts as in an injector and the solution which remains in the thermo-siphon is sucked, before its vaporization and before reaching the ends of the tubes of the cluster.

On account of the speed so acquired, the exchange of heat between the steam and the solution is very rapid, and the greatest part of the solution gets out of the cluster in a vesicular state, that is made up of drops of steam enclosed in a liquid film. When they arrive in the vacuum chamber, said drops burst and the steam is removed by the vacuum pump.

What remains of the liquid, if the section of the opening has been well designed is thrown in the chamber finely atomized, and it follows that the water removed by the vacuum pump is eliminated, without the necessity of furnishing heat for its evaporation.

It is clear that the apparatus here described is a variation of that described in the above mentioned patent, which enables the process of extraction of "Osseine" to be adapted to the concentration of all products, as well as to the evaporation of all saline solutions.

I claim:

1. In an apparatus for the evaporation and concentration of solutions, an evaporating chamber having a solution inlet, a solution outlet and a vapor outlet, partitions dividing said chamber into sections all of which are in communication with said vapor outlet, depending U-shaped conduits connecting said sections in series, and heating means in said conduits for heating the solution therein to cause thermo-siphonic circulation thereof.

2. In an apparatus for the evaporation and concentration of solutions, an evaporating chamber having a solution inlet, a solution outlet and a vapor outlet, partitions dividing said chamber into sections all of which are in communication with said vapor outlet, fluid conduits connecting said sections in series and means for heating the solution in said conduits to cause thermo-siphonic circulation thereof.

In testimony whereof I affix my signature.

GEORGES HECTOR PASSELECQ.